Patented Jan. 15, 1952

2,582,840

UNITED STATES PATENT OFFICE 2,582,840

SIZING FIBROUS MATERIALS WITH MODIFIED UREA-FORMALDEHYDE RESIN

Charles S. Maxwell, Old Greenwich, Conn., assignor to American Cyanamid Company, New York, N. Y., a corporation of Maine No Drawing. Application September 7, 1946, Serial No. 695,550

4 Claims. (Cl. 92—21)

This invention relates to the impregnation of fibrous material with thermosetting urea-formaldehyde resins and to the production of paper and other water laid fiber products from fibers so impregnated. A principal object of the invention is the provision of a method for the production of waterlaid fiber products wherein an aqueous fiber suspension is treated with a colloidal urea-formaldehyde resin in such a manner as to precipitate or otherwise deposit substantial quantities of the resin on the fibers, followed by forming the fibers into paper or other waterlaid fiber product, without the necessity of substantial deviation from standard commercial practice. A further object is the application of urea-formaldehyde resins by the above-described procedure to a wide variety of vegetable, animal and mineral fibers, or to mixtures thereof, as will hereinafter be more fully explained.

It has previously been proposed to impregnate sheets of paper with ordinary urea-formaldehyde resin syrups by processes in which the dried or partially dried paper is immersed in a water solution of the resin, or sprayed with the resin solution, followed by heating to dry the paper and cure the resin to a water-insoluble condition. This procedure has resulted in paper of good wet strength, although the folding endurance of the paper is considerably reduced. However, it is greatly preferable to introduce the resin into the papermaking fibers while the latter are suspended in water prior to the sheet-forming step, and the present invention presents a commercially feasible method of accomplishing this result.

Attempts have also been made to improve the wet strength, stiffness and other properties of properties of products composed of or containing mineral fibers, such as waterlaid asbestos products. The process of the present invention can be used for the application of urea-formaldehyde resins to mineral fibers such as asbestos while the fibers are suspended in water, and when this is done the asbestos paper or other waterlaid asbestos products made from these pretreated fibers by standard wet-forming processes have greatly enhanced wet and dry tensile strengths when heated to cure the resin therein.

The urea-formaldehyde resins used in practicing the present invention are employed in the form of colloidal aqueous solutions of partially polymerized, negatively charged dimethylol urea resins. These colloidal solutions are described and claimed in my copending application Serial No. 464,109 filed October 31, 1942, maturing into U. S. Patent No. 2,407,376 dated September 10, 1946. The fact that the anionic resin particles will deposit themselves upon positively charged fibrous materials such as asbestos and glass fibers and animal fibers such as wool, felt, furs, etc., even from dilute solutions and that felted products of improved wet and dry tensile strength are obtained when animal and mineral fibers treated with the resin in this manner are formed into paper or molded into insulating board is specifically stated in that patent, of which the present application is a continuation-in-part. The application of the colloidal anionic dimethylol urea resin solutions to negatively charged fibers such as fibers of cellulosic material, for example kraft paper stock, is also described in this patent.

The partially polymerized anionic dimethylol urea resins are prepared in the form of colloidal aqueous solutions by sulfonation processes, and may be applied to aqueous suspensions of fibrous material either as free sulfonic acids or in a slightly acid, neutral or alkaline condition in which the sulfonate groups are partially or completely neutralized with sodium, ammonium or other cationic salt-forming radicals. For application to asbestos and other mineral fibers which are alkaline in character sulfonated urea-formaldehyde resins containing unneutralized or only partially neutralized sulfonic acid groups are preferable. However, the partially or completely neutralized dimethylol urea resin sulfonates are much more stable on storage than are the corresponding unneutralized resins, as is pointed out in my copending application Serial No. 511,339 filed November 22, 1943, now abandoned, and therefore this class of colloidal, anionic resins is preferred for the treatment of animal fibers such as wool, furs, etc. and for application to vegetable fibers such as staple cotton fibers, kraft paper stock, sulfite paper stock and the like.

The sulfonated anionic urea-formaldehyde resins may be prepared by sulfonating a preformed substantially monomeric urea-formaldehyde condensation product such as dimethylol urea or by condensing urea with formaldehyde in the presence of a sulfonating agent such as sodium sulfite or sodium bisulfite or sodium metabisulfite or by reacting urea with a formaldehyde product which is already partially sulfonated, such as an aqueous formaldehyde solution containing sufite or bisulfite-formaldehyde, and any of these or similar methods may be used in preparing the colloidal anionic urea-formaldehyde solutions used in practicing the present invention. One convenient method of obtaining a product that may be applied directly to asbestos, or to kraft paper stock in the presence of aluminum sulfate, cationic melamine-formaldehyde resin solutions and the like is described in my Patent No. 2,407,376 referred to above. This method consists in reacting an aqueous solution of substantially monomeric dimethylol urea resin with sufficient quantities of a water solution of sulfur dioxide, to reduce the pH of the resin solution below 3.0 and preferably below 2.0, using amounts equivalent to from 5 to 50 cc. of a water solution containing 3.5% by weight of sulfur dioxide to a water solution containing 10 grams of dimethylol urea. After the slufur dioxide solution has been added the resulting mixture is allowed to age until the formation of a haze indicative of the colloidal condition is noted. This reaction is relatively fast; at room temperature the solution becomes hazy after about 10 minutes in a 10% resin solution. When the polymerization has progressed to the stage where the resin is in the desired colloidal condition the solution is diluted with water or neutralized with alkali or both. The mechanism of this reaction is explained in my application Serial No. 511,339, referred to above, as follows:

The quantities of sulfurous acid specified represent a ratio of 0.033:0.33 mol of sulfur dioxide for each mol of dimethylol urea. Upon addition of the sulfur dioxide solution the bisulfite or sulfite ions combine with some of the dimethylol urea molecules to form a water-soluble sulfonic acid derivative thereof. As these sulfonated molecules are copolymerized with other unsulfonated molecules of dimethylol urea in the resin solution they exert a water-solubilizing action on the polymer and thus a hydrophilic colloid is formed which appears as a colloidal haze in the solution. However, the acidity resulting from the hydrogen ions of the sulfurous acid causes the polymerization to continue rapidly beyond the colloidal range so that eventually the solubilizing effect is overcome and the hydrophilic colloid is converted into a water-insoluble gel or precipitate. By neutralizing the acidity of the solution with a water-soluble alkali such as sodium or ammonium hydroxide to a pH of 6.5-10, and preferably about 6.5-8.0, further polymerization of the colloid is arrested and the neutralized solution remains stable for extended periods of time.

When neutral or alkaline sulfonating agents such as sodium sulfite or sodium bisulfite are used the initial condensation product, if prepared under alkaline conditions, must be acidified to a pH below 6.5 before the resin can be polymerized to the colloidal condition. The rate of polymerization increases with the temperature and with the degree of acidification; thus, for example, at pH values between about 3.0 and 6.5 the rate of polymerization is slower than in the more strongly acidified solutions that are obtained when free sulfurous acid is used as the sulfonating agent, and the polymerization is therefore usually carried out at higher temperatures of 50°-100° C. However, the heating period can be materially reduced by acidifying the initial urea-formaldehyde-sulfite or bisulfite condensation product with sufficient acid such as hydrochloric, formic or acetic acid to a relatively low pH value, such as a pH of about 2-4, and heating the solution under reflux until the polymerization has reached a stage less than that desired in the final product, followed by raising the pH to about 4-5 and continuing the heating at 60°-80° C. until the colloidal aqueous solution of anionic urea-formaldehyde resin has reached the desired viscosity. By this method the degree of polymerization can be closely controlled.

Neutralized colloidal aqueous solutions of urea-formaldehyde-sulfite or bisulfite resins prepared by any of the above-descibed methods can be flocculated or precipitated by the addition of sufficient acid to reduce the pH below 6.5. Both the neutralized solutions and the unneutralized solutions prepared by the use of sulfurous acid are flocculated or precipitated in the presence of aluminum sulfate and other salts having an acid reaction, and this property is utilized in applying the resins to vegetable fibers such as cotton, kraft paper pulp, sulfite paper pulp and the like. Preferable the alum or other flocculating agent is added to water suspension of the vegetable fibers, as in the beater of a paper mill, after which the colloidal aqueous resin solution is added. The resin is flocculated and deposited on the cellulosic vegetable fibers while the latter are still suspended in water and the stock so treated is formed into paper or other felted product on a wire or cylinder in the usual manner. The resin, being in a partially polymerized condition, is readily cured to the water-insoluble stage wherein wet strength is developed in the paper by heating the paper impregnated therewith at the relatively low temperatures of 180-300° F., which can be obtained by passing it over steam-heated drying rolls. The hot paper can be maintained at curing temperatures for more extended periods of time, if desired, by winding it into rolls without cooling. Amounts of 0.1% to 5% or more of the resin, based on the dry weight of the paper or other fibrous cellulosic product, may be applied and cured by this method.

To prepare waterlaid mineral fiber products of increased wet strength with the above-described anionic dimethylol urea solutions it is merely necessary to prepare an aqueous dispersion of mineral fibers such as asbestos, mineral wool, etc. and if desired, admixed therewith in varying proportions of one or more other fibers of animal, vegetable or synthetic origin such as kraft fibers, sulfite fibers, sulfate fibers, groundwood fibers, regenerated cellulose, cellulosic esters and ethers, hemp, jute, flax, ramie, hair, wool, nylon, silk, metallic filaments, etc. and add thereto a desired quantity of an aqueous dispersion of the partially polymerized negatively charged dimethylol urea and thereafter forming a waterlaid sheet from the suspension. The term asbestos is employed herein in a generic sense to include the various asbestos type mineral fibers such as aminanthus, amphibole, chrysotile, serpentine, crocidolite, etc. The formation of the waterlaid product may take place immediately after incorporation of the resinous dispersion without the addition of any conventional precipitant. Because of the natural attraction of the positively charged mineral fibers and the negatively charged resinous particles the latter are uniformly deposited on the mineral fiber and a felted product can be formed in which the resin is uniformly deposited on the fibers throughout the structure of the product.

The amount of anionic dimethylol urea polymer incorporated with the fiber suspension depends of course upon the character of the product desired. The retention of the resin by the fiber varies somewhat with the colloidal condition of the resin and this factor should also be taken into consideration in determining the amount of the resin dispersion that is mixed with the asbestos fiber. As shown by the specific examples the retention of the resin can normally be expected to be 50% or higher. When using a closed circulation system for the white water, the process may be operated economically with a much lower initial retention, since a higher overall retention is thus obtained. The amount of resin incorporated in the fibrous product can vary considerably and when amounts of as low as 0.5% of the polymer, based on the dry weight of the fiber, is used the sheet shows an increased wet strength. On the other hand as much as 15% by weight of the polymer may be incorporated into the finished product without losing the characteristics of a waterlaid asbestos product.

Any of the conventional methods of forming waterlaid fibrous products may be employed. The treated mineral fiber suspension may be diluted to paper-making consistency and run out on a papermaking machine of the Fourdrinier type, or the waterlaid product may be formed on a cylinder machine in which case any one or more of the several plies may be treated with the anionic dimethylol urea polymer. The aqueous suspension of treated mineral fibers may also be fed to molding machines where felted products of various shapes may be formed. As will be apparent from what has been said hereinabove the resin particles are firmly deposited on the mineral fibers and special precautions need not be taken to prevent their discharge therefrom. Accordingly, the felting operation is essentially a conventional one.

After the product has been formed it is dried and the resin is cured. The curing step is a simple one and may be accomplished by heating the product for a short time at elevated temperatures. In general the temperature of heating will range from 200°–300° F. with a curing time of from 2–30 minutes. If desired, conventional catalysts for the curing of urea-formaldehyde resins may be employed, but these are usually unnecessary as the resin is self-curing.

It will thus be seen that the present invention applies to fibrous material capable of being felted or otherwise formed into waterlaid or molded articles a thermosetting urea-formaldehyde resin which is in an advanced stage of polymerization. Because this urea resin is already partially polymerized it requires only a small amount of additional heating to cure it to the final, water-insoluble stage wherein it develops wet strength and other desirable properties in the finished fibrous products. However, because of the presence of sulfonic acid groups in the partially polymerized resin particles, the resin is hydrophilic in character and can therefore be applied to aqueous suspensions of the fibers at high dilutions without becoming hydrophobic.

The preparation of the colloidal aqueous solutions of partially polymerized urea-formaldehyde resins is essentially a controlled pre-polymerization or pre-curing of a substantially monomeric dimethylol urea-sulfite or bisulfite condensation product. This polymerization takes place under controlled acid conditions, the sulfonic acid groups preventing premature development of hydrophobic properties in the resin during the polymerization. The result is a colloidal resin solution that is especially well suited for application to fibers in aqueous suspension, since it requires no precipitating agent for deposition on positively charged fibers such as asbestos and only relatively small quantities of alum or other flocculating agent for deposition on cellulosic fibers such as cotton or paper stock, and which later can be cured to an infusible, water-insoluble condition by heating the pretreated fibers at relatively low temperatures of 180°–300° F. and for relatively short periods of time.

The invention will be further illustrated in greater detail by the following specific examples. It should be understood, however, that although these examples may describe in detail some of the more specific features of the invention they are given primarily for purposes of illustration and the invention in its broader aspects is not limited thereto.

*Example 1*

800 grams of air-dried asbestos fiber was added to 10 liters of water in a laboratory beater and the mixture circulated for 15 minutes with the roll up. The stock was then diluted to 2% fiber content and given no further mechanical treatment. Portions of the fiber suspension containing approximately 100 grams of dry fiber were measured out, treated with the various resin solutions described below and then made into handsheets on a Valley sheet machine. As the asbestos sheets were extremely delicate when first formed a porous canvas cloth was placed on the wire of the machine and the sheet formed on it. After the sheet had been felted and the water drawn off the deckle was opened and the cloth with the asbestos sheet formed on it was pressed for one minute at 50 pounds pressure. The asbestos sheet was then removed from the canvas cloth and dried and cured for 5 minutes on a drum drier at 240° F. A sheet was prepared for use as a control without the use of any resin and its properties are indicated in the following table under "Blank."

The remaining sheets were made with a resin solution prepared as follows: 10 grams of dimethylol urea was dissolved in warm water and cooled to room temperature. 20 cc. of a solution containing 3.5% $SO_2$ was then added together with enough additional water to make 100 cc. of solution. This solution was then allowed to stand one minute whereupon it was diluted to 1–1.25% solids. An asbestos sheet labelled #1 in the table below was then prepared by mixing the diluted resin solution with the 2% fiber suspension prior to sheet formation.

A second resin-treated sheet, #2 in the table, was prepared exactly as described above with the exception that the 10% dimethylol urea solution in dilute sulfurous acid was allowed to stand 10 minutes before being diluted to 1–1.25% solids. A third sheet, #3 in the table, was prepared with a dimethylol urea solution which had been allowed to stand 12 minutes at 10% concentration before dilution, and a fourth sheet, #4, was prepared with resin which had aged 13 minutes before dilution, sheet #5 was prepared with a resin solution which had aged 30 minutes at 5% concentration of dimethylol urea before being diluted. In each case the diluted resin solution was mixed with the asbestos fiber suspension within 2 hours after it had been diluted.

|  | Blank | #1 | #2 | #3 | #4 | #5 |
|---|---|---|---|---|---|---|
| Age of resin solution min. | | 1 | 10 | 12 | 13 | 30 |
| Percent of resin in sheet | 0.0 | 0.39 | 3.52 | 5.37 | 5.76 | 3.74 |
| Per cent of resin retained | | 4.3 | 38.7 | 59.0 | 63.4 | 41.1 |
| Basis weight of sheet lbs. | 386 | 324 | 414 | 404 | 423 | 330 |
| Stiffness (Gurley) mg. | 560 | 680 | 5,500 | 8,200 | 11,000 | 2,800 |
| Wet rub (Aminco) | <1 | <1 | 1,245 | 10,000+ | 10,000+ | 35 |

As will be seen from these results the wet strength and stiffness of the asbestos sheets is increased remarkably by treatment with the anionic dimethylol urea resin solution. It will also be noted that the retention of the resin by the asbestos fiber increases as the dimethylol urea is allowed to partially polymerize and become anionic through aging for a few minutes. Insufficient aging or allowing the solution to stand too long very materially reduces the retention of the resin and the wet strength and stiffness of the resulting sheet.

*Example 2*

Asbestos sheets were prepared with an anionic dimethylol urea resin solution and starch. In this series of tests an asbestos sheet was prepared by adding 3% by weight of dry starch (Colloidite S) based on the dry weight of the asbestos fiber to a 2% asbestos suspension followed by sheet formation, pressing, and drying for 5 minutes on a drum drier at 240° F. as in Example 1. In a second sheet 5% of an anionic dimethylol urea solution as described in Example 1 was added to the slurry 5 minutes after the starch had been added. The slurry was then run through a Valley sheet machine and the sheet pressed and dried as before. A third sheet was prepared in the same way with the exception that 1% of a cationic trimethyl melamine resin solution was added to the asbestos slurry 5 minutes after the addition of the anionic urea resin solution.

The colloidal melamine-formaldehyde resin solution used in the preparation of this sheet was made as follows: 100 cc. of water was heated to 140° F. and 10.4 cc. of 20° Bé. commercial hydrochloric acid was then added followed by the addition of 25 grams of trimethylol melamine. After complete solution cold water was added to make a total volume of 208 cc. and the solution was allowed to age 24 hours. This gave a colloidal cationic melamine resin solution containing 12% resin solids or 1 pound of resin/gal. of solution. Further details on the preparation and physical characteristics of these cationic melamine resin solutions are given in the copending application of Charles S. Maxwell and Chester G. Landes, Serial No. 453,032, filed July 31, 1942, now Patent No. 2,559,220.

After adding the cationic melamine resin solution to the asbestos the suspension was allowed to stand for 5 minutes before forming a sheet. The characteristics of the various sheets described above are given in the following table.

|  | Blank | 3% Starch | 3% Starch, 5% Urea Resin | 3% Starch, 5% Urea Resin, 1% Melamine Resin |
|---|---|---|---|---|
| Basis wt. sheet, lbs. | 386 | 439 | 433 | 464 |
| Tensile strength, lb., 1" strip—Dry | 0.7 | 8.6 | 12.3 | 15.2 |
| Tensile strength, lb., 1" strip—Wet | 0.0 | 0.4 | 0.9 | 1.6 |
| Stiffness (Gurley), mg. | 560 | 7,000 | 9,600 | 13,000 |
| Wet rub (Aminco) | <1 | 256 | 10,000+ | 10,000+ |

Similar results were obtained when a slurry of asbestos fibers of approximately 2% fiber content was treated with 6% of a paraffin wax emulsion, allowed to stand 5 minutes, treated with 3% of aluminum sulfate (based on dry fiber content), allowed to stand 5 more minutes and treated with 5% by weight of the anionic dimethylol urea solution.

*Example 3*

A series of tests were made on the effectiveness of the anionic urea-formaldehyde resin solution on sheets made from 25% kraft fibers and 75% asbestos fibers. A sheet was prepared from a slurry of fibers having this composition and its physical characteristics are indicated in the following table under "Blank." To a slurry containing 1.5% asbestos fibers and 0.5% kraft fibers, which had been thoroughly mixed, was added 10% by weight, based on the dry weight of the asbestos, of anionic dimethylol urea resin solution prepared as described in Example 1, and allowed to age 10 minutes before being diluted. After allowing the fiber suspension to stand for 5 minutes after the resin had been mixed therewith a sheet was formed, pressed, and dried for 5 minutes at 240° F. on a drum drier. The characteristics of the sheet were as follows:

|  | Blank | Urea Resin Only | Fiber Treated and Mixed |
|---|---|---|---|
| Basis wt. sheet, lbs. | 383 | 295 | 356 |
| Tensile strength, lbs. 1" strip, dry | 5.9 | 12.8 | 11.9 |
| Tensile strength, lbs. 1" strip, wet | 0.5 | 1.5 | 1.9 |
| Stiffness (Gurley), mg. | 5,000 | 6,600 | 15,200 |
| Wet rub (Aminco) | 3 | 5,865 | 10,000 |

Tests were also made in which a mixture containing about 25% of cellulosic fibers (kraft paper stock) and about 75% of asbestos fibers were first treated with the cationic melamine resin solution, using 3–5% of resin solids on the basis of the cellulosic material in the paper stock at a dilution of 0.5–1% of cellulosic fibers, and then adding the anionic urea-formaldehyde resin solution at a concentration of 1–2% on the basis of the asbestos fibers in the stock at a total stock dilution of 2–3% total solids. Handsheets were also made from the mixture treated by this method and tested for wet strength, and it was found that they possessed a considerably greater degree of wet strength than other sheets treated with either the cationic melamine resin or the anionic urea resin alone.

A colloidal anionic dimethylol urea resin solution was prepared as described in Example 1 and diluted to 1% resin solids. Fibers of wool were suspended in one portion of the solution and stirred for 5 minutes and the suspension was then filtered with suction on a Büchner filter. The filter cake, which consisted of a felted mass of wool fibers, was pressed and dried at 250° F.

for 5 minutes. The fibers were then found to be cemented together by the cured resin.

*Example 4*

A urea-formaldehyde-bisulfite condensation product was prepared by refluxing a mixture of 25 parts by weight of urea, 67.7 parts of 37% aqueous formaldehyde and 5.1 parts of sodium bisulfite at a pH of 9.2 for 30 minutes. The resulting clear resin syrup was cooled and acidified to a pH of 2.4 to 2.7 by adding 1.14 parts by weight of 10% hydrochloric acid and the resin was polymerized by heating the solution at its boiling point under a reflux condenser for about one hour. Sufficient 10% sodium hydroxide solution was then added to raise the pH to 4.3 and the heating was continued at 60–70° C. for 30–60 minutes, or until the resin had polymerized to the desired colloidal particle size, as shown by a Gardner-Holdt viscosity of at least 250 centipoises. The polymerization was then stopped by adding 0.2 part by weight of 10% sodium hydroxide solution and cooling to room temperature. The final resin solution contained 50–55% solids and had a pH of 7.5–8.0 and was miscible with water in all proportions.

Bleached southern kraft paper pulp was suspended in water and beaten and refined in the usual manner. 1.25% of rosin size, based on the dry weight of the fiber, was added in the beater along with sufficient aluminum sulfate to adjust the pH of the stock suspension to 4.9–5.1. The stock was then made into paper on a Fourdrinier machine equipped with 14 drying rolls supplied with steam at 45 lbs. per sq. in. gage.

The dimethylolurea-sulfite resin solution was diluted with water and introduced at constant speed into the stock suspension immediately after the fan pump in quantities such that 2.7% of resin solids were added, based on the dry weight of the paper pulp. The stock was then run out on the paper making wire, formed into paper, and passed over the drying rolls in the usual manner. Samples of the paper were taken at intervals during the run and upon analysis were found to contain 0.9% of the urea-formaldehyde resin. These sheets were tested for bursting strength, dry and wet tensile strength and other physical properties before and after an additional cure of 30 minutes at 105° C., with the following results:

| Mullen | | Tensile Strength, lbs/in. | | | | M. I. T. Fold | | Wet Rub |
|---|---|---|---|---|---|---|---|---|
| | | Machine Direction | | Cross Direction | | | | |
| Dry | Wet | Dry | Wet | Dry | Wet | M. D. | C. D. | |
| 28.0 | 7.8 | 23.1 | 3.9 | 12.8 | 2.2 | 263 | 237 | 42 |
| 28.4 | 10.0 | 22.9 | 4.3 | 12.9 | 2.8 | 248 | 274 | 54 |

Similar results were obtained when 5% of the resin (based on the dry fiber weight) was added to a 2% water suspension of asbestos fibers, except that about 50% of the resin was retained by the asbestos fibers when no alum was added and about the same amount was retained when varying amounts of alum from 1% up to 5% were added. In both cases the wet strength of paper formed from the resin-treated asbestos was greatly improved.

What I claim is:

1. A method of making paper having substantial wet strength by reason of a content of 0.1–5% of a cured area-formaldehyde resin impregnated uniformly therein which comprises preparing a water suspension of paper making fibers, adding to said suspension an aqueous solution of a partially polymerized hydrophilic urea-formaldehyde-sulfite resin colloid, precipitating said resin or said fibers in amounts of 0.1–5% by weight thereof, forming the resin-containing fibers into a waterlaid product, and heating the wet, waterlaid fiber product so formed to cure the urea-formaldehyde-sulfite resin in situ in the felted fibers while simultaneously drying the same, the said simultaneous curing of the resin and drying of the felted fibers being effected by subjecting the wet, waterlaid product to a temperature between 180° and 300° F. for not more than five minutes, the time and temperature of such heating being sufficient to cure the resin to a water-insoluble condition capable of imparting improved wet strength to the felted fiber product and to produce a dry, waterlaid fiber product containing felted fibers bonded togeher by the so-cured resin.

2. A method of making paper comprising cellulosic fibers, said paper having substantial wet strength by reason of a content of 0.1–5% of its dry weight of a cured urea-formaldehyde resin impregnated uniformly therein, which comprises adding to a water suspension of paper making fibers including a cellulosic fibers an aqueous solution of a partially polymerized hydrophilic urea-formaldehyde-sulfite resin colloid, precipitating said resin on said fibers in amounts of 0.1–5% by weight thereof, forming the resin-containing fibers into a waterlaid product, and curing the resin in situ in the waterlaid fiber product while simultaneously drying the same by subjecting the wet, waterlaid fiber product to a temperature between 180° and 300° F. for not more than five minutes, the time and temperature of such heating being sufficient to cure the resin to a water-insoluble condition capable of imparting improved wet strength to the felted fiber product and sufficient to produce a dry waterlaid fiber product containing felted fibers bonded together by the so-cured resin.

3. A method of making paper comprising asbestos fibers, said paper having substantial wet strength by reason of a content of 0.1–5% of its dry weight of a cured urea-formaldehyde resin impregnated uniformly therein, which comprises adding to a water suspension of paper making fibers including asbestos fibers an aqueous solution of a partially polymerized hydrophilic urea-formaldehyde-sulfite resin colloid, precipitating said resin on said fibers in amounts of 0.1–5% by weight thereof, forming the resin-containing asbestos fibers into a waterlaid product, and simultaneously drying the wet waterlaid fiber into a waterlaid product, and simultaneously drying the wet waterlaid fiber product and curing the resin in situ therein by subjecting the wet, waterlaid fiber product to a temperature between 180° and 300° F. for not more than five minutes, the time and temperature of said heating being sufficient to cure the resin to a water-insoluble condition capable of imparting improved wet strength to the felted fiber product and sufficient to produce a dry, waterlaid asbestos fiber product containing felted fibers bonded together by the socured resin.

4. A method according to claim 1 in which the urea-formaldehyde-sulfite resin solution is a solution of a resin produced by copolymerizing sulfonate dimethylol urea resin with unsulfonated dimethylol urea resin at a pH below 6.5 until a resin is obtained which is in an advanced stage of polymerization but which is still hydrophilic in character because of its sulfonate groups.

CHARLES S. MAXWELL.

REFERENCES CITED

The following references are of record in the file of this patent:

UNITED STATES PATENTS

| Number | Name | Date |
|---|---|---|
| 2,136,110 | Lane et al. | Nov. 8, 1938 |
| 2,338,602 | Schur | Jan. 4, 1944 |
| 2,343,090 | Smith | Feb. 29, 1944 |
| 2,343,095 | Smith | Feb. 29, 1944 |
| 2,345,543 | Wohnsiedler et al. | Mar. 28, 1944 |
| 2,401,027 | Tausch | May 28, 1946 |
| 2,407,376 | Maxwell | Sept. 10, 1946 |
| 2,407,599 | Auten | Sept. 10, 1946 |
| 2,492,702 | Neubert et al. | Dec. 27, 1949 |

FOREIGN PATENTS

| Number | Country | Date |
|---|---|---|
| 502,856 | Great Britain | Mar. 21, 1939 |
| 523,185 | Great Britain | July 8, 1940 |

OTHER REFERENCES

Paper Industry and Paper World, June 1943, pages 263–269.